Patented Jan. 11, 1949

2,459,128

UNITED STATES PATENT OFFICE 2,459,128

METHOD FOR PRODUCING NITRILES

Marvin Jay Fahrenbach, Westfield, N. J., assignor to American Cyanamid Company, New York, N. Y., a corporation of Maine No Drawing. Application May 18, 1946, Serial No. 670,833

10 Claims. (Cl. 260—297)

This invention relates to the production of nitriles from amides and more particularly to improvements in such processes in which phosphorus oxychloride is used as a dehydrating agent.

In the past it has been proposed to use phosphorus oxychloride as a dehydrating agent in order to transform amides into nitriles. The process does in fact result in the production of nitriles but the yields are poor and the quality of products obtained is often inferior. These disadvantages have seriously interfered with the use of the phosphorus oxychloride dehydration process in the production of nitriles.

According to the present invention it has been found that markedly improved yields of purer product can be obtained if the reaction is carried out in the presence of a sulfite, such as an alkali metal sulfite or preferably a metabisulfite. In the latter case smaller amounts may be used as the metabisulfite contains two sulfur dioxide equivalents per mol, and a smoother reaction is obtained because of less heat evolution.

The amounts to be used are not critical, but it is desirable to use sufficient sulfite so that there is liberated one mol of $SO_2$ for each mole of water removed from the amide.

The present process does not materially change the desirable amounts of phosphorus oxychloride to be used and the amount is not critical. However, best results are obtained when about 4 mols of phosphorus oxychloride are used for each amide group present in the molecule.

The operating conditions are not materially changed, the dehydration taking place, as is usual, by heating to temperatures near the boiling point of water. The reaction not only produces better yields of purer products but proceeds smoothly and does not require critical control.

The process of the present invention is applicable generally to the dehydration of amides, with few exceptions. The exceptions appear to be encountered in the case of certain orthodiamides, such as phthalamide, in which case the amide appear to revert to the acid with the production of some phthalimide.

The amount of improvement in yield or purity, or both, which is obtainable by means of the present invention will vary with different amides. The following specific examples are typical illustrations. The parts are by weight.

EXAMPLE 1

6-methyl-3,4-dicyano-2-pyridone 50 parts of 6-methyl-4-carbamyl-3-cyano-2-pyridone were added to 173 parts of phosphorus oxychloride followed by the addition of 27 parts of sodium metabisulfite. The reaction mixture was then heated to about 70–80° C., at which temperature a fairly vigorous reaction proceeded with evolution of $SO_2$ and gaseous HCl. After the vigorous reaction had subsided more heat was applied and the temperature gradually raised to 95° C. and maintained at this temperature until all of the amide appeared to be dehydrated as evidenced by a change in crystal form. From 15 to 60 minutes at 95° C. usually suffices while excessively long heating results in lowered yields.

The reaction mixture was then cooled to 10° C. and was drowned on ice. A dark slurry resulted and after standing for about an hour at 0° C. it was filtered and the solid washed with ice water and dried at a moderate temperature. A yield of 48.8% of crude dinitrile was obtained in the form of olive yellow crystals having a melting point of 241–243° C. This product was recrystallized from an acetone-ether mixture and proved to be 95% pure dinitrile. The yield was thus 46.3% of pure product.

EXAMPLE 2

6-methyl-3,4-dicyano-2-pyridone 250 parts of 6-methyl-4-carbamyl-3-cyano-2-pyridone were mixed with 862 parts of phosphorus oxychloride. To this was added 90 parts of sodium sulfite. The temperature rose from 29 to 33° C. after the addition of the amide and from 33 to 41° C. after the addition of the sodium sulfite. By means of external heating, the temperature was raised to 90–93° C. After 15 minutes, an additional 90 parts of sodium sulfite was added to the hot reaction mixture; a vigorous reaction and evolution of sulphur dioxide occurred at this time. Heating at 90–93° C. was continued for 18 minutes. The reaction mixture was then cooled to 5° C. and 297 parts of acetone were added. This slurry was drowned in 7200 parts of ice. After the solution stood until all of the ice was melted, the dinitrile was filtered off, washed well with water, and dried at 50° C. Yield was 56.6% (based on the amide used) of excellent quality greenish-yellow dinitrile;

M. P.=243.5° C.–244.5° C.

Recrystallization of 5.1 parts of this dinitrile from acetone-ether solution yielded 4.42 parts of very pure material; color was a deep greenish yellow, M. P.=244.5–245° C.

EXAMPLE 3

50 parts of 6-methyl-4-carbamyl-3-cyano-2-pyridone were mixed with 172 parts of phosphorus oxychloride, and then 36 parts of sodium sulfite were added. The temperature rose rather rapidly to 85° C. and a large amount of $SO_2$ was evolved. The temperature was held at 90–93° C. for 38 minutes, then lowered to 0° C. and 60 parts of acetone added. The reaction mixture was drowned into 1500 parts of ice. After standing for 1 to 2 hours, the slurry was filtered. The dinitrile was washed with cold water and dried overnight at 50° C. yield 51.2%;

M. P.=236.5°–237.5° C.

The color was slightly darker than that obtained in Example 2.

When the procedure of Examples 1, 2 or 3 was followed without the addition of a sulfite a yield of 47.1% of crude dinitrile was obtained which melted at 243–247° C. On recrystallization from acetone-ether the product proved to be only 69% dinitrile, so that the yield of pure dinitrile was only 32.4%.

EXAMPLE 4

Malononitrile 50 parts of cyanoacetamide were added to 262 parts of phosphorus oxychloride, followed by 46.6 parts of sodium metabisulfite. The mixture was then heated and as the temperature approached 62° C. a vigorous reaction commenced with evolution of $SO_2$ and gaseous HCl. The temperature was maintained at 62° C. until the vigorous reaction was over and then raised to 98° C. at which point the evolution of gases had almost ceased. The excess phosphorous oxychloride was then removed by vacuum distillation and the residue extracted with ethyl acetate. After evaporating off the solvent a residue was obtained which was purified by vacuum distillation (boiling point 109–114° C. at 26 mm.). The yield was 71.4% based on the cyanoacetamide used.

When the same procedure was followed without the addition of any metabisulfite a yield of only 14.1% of the dinitrile was obtained.

EXAMPLE 5

Phenylacetonitrile 38 parts of phenylacetamide and 26.8 parts of sodium metabisulfite were added to 173 parts of phosphorus oxychloride. The solution was heated, vigorous reaction starting at 64–65° C. with evolution of gases. After the reaction had subsided, the temperature was raised to 98° C., at which point gaseous evolution had practically ceased. The solution was then drowned in ice, allowed to stand for about an hour at 0° C. and the oil layer extracted with ether. The ether extract was dried with anhydrous calcium chloride, and after removal of the ether the residue was purified by vacuum distillation (boiling point 107–110.5° C. at 14 mm.). The yield was 92.5% based on the phenylacetamide used.

When the process was carried out without the sodium metabisulfite the yield was 33.5%.

EXAMPLE 6

Benzonitrile 34.3 parts of benzamide and 27 parts of sodium metabisulfite were added to 173 parts of phosphorus oxychloride. The solution was heated to 90–95° C. Heating was continued until the solution was almost colorless, with a small amount of suspended white solid remaining. After cooling to 10° C. the mixture was drowned on ice, allowed to stand for one hour at 0° C. and then extracted with ether. The ether extract was dried overnight with anhydrous sodium sulfate, and after removal of ether, the benzonitrile was obtained as a light yellow oil, boiling at 93–94° C. at 34 mm., and having a refractive index $N_D^{28}$=1.5235. The yield was 89.3%, based on the benzamide used.

When the process was carried out without the sodium metabisulfite, the yield of benzonitrile was only 75.5%, and the solution before drowning was a deep orange color instead of colorless.

EXAMPLE 7

Myristonitrile 64.3 parts of myristamide and 27 parts of sodium metabisulfite were added to 173 parts of phosphorus oxychloride and the solution heated to 90–95° C. When the reaction appeared complete, the mixture was cooled to 10° C. and drowned on ice. After standing for about an hour at 0° C. the mixture obtained was extracted with ether and the extract dried with anhydrous sodium sulfate. After removing the ether, a residue of myristonitrile was obtained which was purified by vacuum distillation (boiling point 161–163° C. at 11 mm.). The yield was 93% based on the myristamide used.

When the procedure was followed without the addition of sodium metabisulfite, the yield was only 88.7% of a soapy looking oil.

EXAMPLE 8

2-phenylcinchoninonitrile 10 parts of 2-phenylquinoline-4-carboxamide and 3.83 parts of sodium metabisulfite were added to 58.4 parts of phosphorus oxychloride and the mixture gently refluxed. After all of the solid had dissolved, the solution was cooled at 10° C. and drowned in ice. After standing for an hour at 0° C., the mixture was filtered, the precipitate washed with cold water and dried at a moderate temperature. A yield of 95.6% of 2-phenylcinchoninonitrile was obtained in the form of a light yellow powder. This compares with a yield of 91.2% when the metabisulfite was eliminated.

This application is in part a continuation of my copending application, Serial No. 591,636, filed May 2, 1945, now abandoned.

I claim:

1. A method of dehydrating monoamides which comprises heating the amide with phosphorus oxychloride in the presence of an inorganic sulfite and recovering the resulting nitrile.

2. A method of dehydrating monoamides which comprises heating the amide with phosphorus oxychloride in the presence of an alkali metal metabisulfite and recovering the resulting nitrile.

3. A method according to claim 1 in which the phosphorus oxychloride is present in amounts of about 4 mols of phosphorus oxychloride per mol of amide and a sufficient amount of a sulfite is added to liberate about one mole of $SO_2$ per mol of water removed in the reaction.

4. A method according to claim 2 in which the phosphorus oxychloride is present in amounts of about 4 mols of phosphorus oxychloride per mol of amide and a sufficient amount of an alkali metal bisulfite is added to liberate about one mole of $SO_2$ per mol of water removed in the reaction.

5. A method according to claim 1 in which the amide is 6 - methyl - 4 - carbamyl - 3 - cyano - 2-pyridone.

6. A method according to claim 2 in which the amide is 6 - methyl - 4 - carbamyl - 3 - cyano - 2-pyridone.

7. A method according to claim 1 in which the amide is cyanoacetamide.

8. A method according to claim 2 in which the amide is cyanoacetamide.

9. A method according to claim 1 in which the amide is phenylacetamide.

10. A method according to claim 2 in which the amide is phenylacetamide.

MARVIN JAY FAHRENBACH.

REFERENCES CITED

The following references are of record in the file of this patent:

UNITED STATES PATENTS

| Number | Name | Date |
|---|---|---|
| 1,828,267 | Wilcke | Oct. 20, 1931 |
| 1,876,652 | Fische | Sept. 13, 1932 |
| 2,242,309 | Lazier et al. | May 20, 1941 |
| 2,297,811 | Stocker | Oct. 6, 1942 |
| 2,387,435 | Fleysher | Oct. 23, 1945 |
| 2,389,217 | Surrey | Nov. 20, 1945 |

FOREIGN PATENTS

| Number | Country | Date |
|---|---|---|
| 184,301 | Switzerland | Aug. 1, 1936 |
| 651,611 | Germany | Oct. 18, 1937 |
| 706,198 | Germany | May 20, 1941 |